(12) United States Patent
Yao et al.

(10) Patent No.: US 12,082,038 B2
(45) Date of Patent: Sep. 3, 2024

(54) QOS MONITORING CONTROL FOR 5G NETWORKS

(71) Applicant: Intel Corporation, Santa Clara, CA (US)

(72) Inventors: Yizhi Yao, Chandler, AZ (US); Joey Chou, Scottsdale, AZ (US)

(73) Assignee: Intel Corporation, Santa Clara, CA (US)

( * ) Notice: Subject to any disclaimer, the term of this patent is extended or adjusted under 35 U.S.C. 154(b) by 364 days.

(21) Appl. No.: 17/219,530

(22) Filed: Mar. 31, 2021

(65) Prior Publication Data

US 2021/0289393 A1    Sep. 16, 2021

Related U.S. Application Data

(60) Provisional application No. 63/005,928, filed on Apr. 6, 2020.

(51) Int. Cl.
| | |
|---|---|
| *H04W 76/10* | (2018.01) |
| *H04L 43/16* | (2022.01) |
| *H04W 24/08* | (2009.01) |
| *H04W 28/02* | (2009.01) |
| *H04W 28/10* | (2009.01) |
| *G16Y 10/75* | (2020.01) |
| *H04W 84/04* | (2009.01) |

(52) U.S. Cl.
CPC ......... *H04W 28/0268* (2013.01); *H04L 43/16* (2013.01); *H04W 24/08* (2013.01); *H04W 28/10* (2013.01); *G16Y 10/75* (2020.01); *H04W 84/042* (2013.01)

(58) Field of Classification Search
None
See application file for complete search history.

(56) References Cited

U.S. PATENT DOCUMENTS

| | | | |
|---|---|---|---|
| 2021/0153070 A1* | 5/2021 | Velev | H04W 28/0268 |
| 2023/0209490 A1* | 6/2023 | Zhu | H04W 60/04 |
| | | | 455/435.1 |

OTHER PUBLICATIONS

"3GPP TS 29.244 V16.6.0 (Dec. 2020)", 3rd Generation Partnership Project; Technical Specification Group Core Network and Terminals; Interface between the Control Plane and the User Plane Nodes; Stage 3 (Release 16), 318 pgs.

* cited by examiner

*Primary Examiner* — Willie J Daniel, Jr.
(74) *Attorney, Agent, or Firm* — Schwegman Lundberg & Woessner, P.A.

(57) ABSTRACT

A system, devices and procedures for providing QoS monitoring in a 5G network are described. The QoS monitoring is per QoS flow per UE or GTP-U path QoS monitoring. A SMF sends a request to a UPF and NG-RAN to report UL/DL packet delay and RTT between the UPF and a UE or an N3 and N9 interface, along with thresholds for reporting the measurements. The UPF sends a report containing the measurements when the threshold is met. The delays include average, minimum and maximum packet delays. The request also indicates a state of QoS monitoring, S-NSSAI and 5QI to monitor, whether event-based/periodic/session release-based QoS monitoring reporting per QoS flow per UE is supported, minimum waiting time between consecutive reports for event-triggered QoS monitoring reporting, and a period to report the measured packet delay.

20 Claims, 8 Drawing Sheets

QOS MONITORING CONTROL FOR 5G NETWORKS

PRIORITY CLAIM

This application claims the benefit of priority under 35 U.S.C. 119(e) to U.S. Provisional Patent Application Ser. No. 63/005,928, filed, Apr. 6, 2020, which is incorporated herein by reference in its entirety.

TECHNICAL FIELD

Embodiments pertain to wireless communications in 5G, or new radio (NR), systems. Some embodiments related to Quality of Service (QoS) monitoring control in 5G networks.

BACKGROUND

The use and complexity of 3GPP LTE systems (including LTE and LTE-Advanced systems) has increased due to both an increase in the types of devices user equipment (UEs) using network resources as well as the amount of data and bandwidth being used by various applications, such as video streaming, operating on these UEs. With the vast increase in number and diversity of communication devices, the corresponding network environment, including routers, switches, bridges, gateways, firewalls, and load balancers, has become increasingly complicated, especially with the advent of next generation (NG) (or new radio (NR)/5th generation (5G)) systems. As expected, a number of issues abound with the advent of any new technology.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1A:
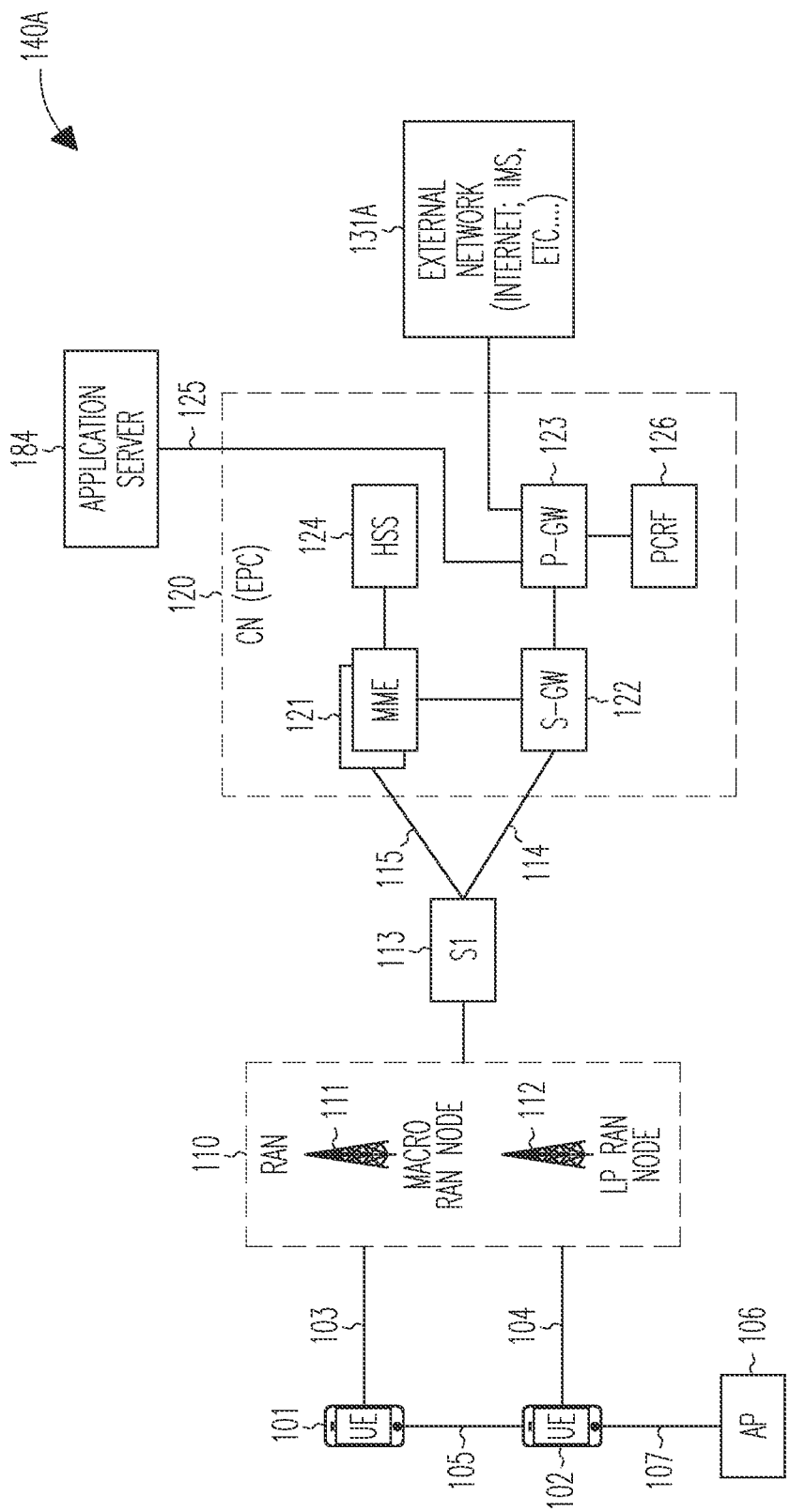
FIG. 1A illustrates an architecture of a network, in accordance with some aspects.

FIG. 1A illustrates an architecture of a network in accordance with some aspects. The network 140A includes 3GPP LTE/4G and NG network functions. A network function can be implemented as a discrete network element on a dedicated hardware, as a software instance running on dedicated hardware, and/or as a virtualized function instantiated on an appropriate platform, e.g., dedicated hardware or a cloud infrastructure.

The network 140A is shown to include user equipment (UE) 101 and UE 102. The UEs 101 and 102 are illustrated as smartphones (e.g., handheld touchscreen mobile computing devices connectable to one or more cellular networks) but may also include any mobile or non-mobile computing device, such as portable (laptop) or desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard. Any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz, and other frequencies and Spectrum Access System (SAS) in 3.55-3.7 GHz and other frequencies). Different Single Carrier or Orthogonal Frequency Domain Multiplexing (OFDM) modes (CP-OFDM, SC-FDMA, SC-OFDM, filter bank-based multicarrier (FBMC), OFDMA, etc.), and in particular 3GPP NR, may be used by allocating the OFDM carrier data bit vectors to the corresponding symbol resources.

In some aspects, any of the UEs 101 and 102 can comprise an Internet-of-Things (IoT) UE or a Cellular IoT (CIoT) UE, which can comprise a network access layer designed for low-power IoT applications utilizing short-lived UE connections. In some aspects, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network. In some aspects, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS)

Terrestrial Radio Access Network (E-UTRAN), a NextGen RAN (NG RAN), or some other type of RAN.

The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth-generation (5G) protocol, a New Radio (NR) protocol, and the like.

In an aspect, the UEs 101 and 102 may further directly exchange communication data via a ProSe interface 105. The ProSe interface 105 may alternatively be referred to as a sidelink (SL) interface comprising one or more logical channels, including but not limited to a Physical Sidelink Control Channel (PSCCH), a Physical Sidelink Shared Channel (PSSCH), a Physical Sidelink Discovery Channel (PSDCH), a Physical Sidelink Broadcast Channel (PSBCH), and a Physical Sidelink Feedback Channel (PSFCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFig) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), Next Generation NodeBs (gNBs), RAN nodes, and the like, and can comprise ground stations (e.g., terrestrial access points) or satellite stations providing coverage within a geographic area (e.g., a cell). In some aspects, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some aspects, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 can be a gNB, an eNB, or another type of RAN node.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN (e.g., as illustrated in reference to FIGS. 1B-IC). In this aspect, the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the EPC network 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some aspects, the communication network 140A can be an IoT network or a 5G network, including 5G new radio network using communications in the licensed (5G NR) and the unlicensed (5G NR-U) spectrum. One of the current enablers of IoT is the narrowband-IoT (NB-IoT). Operation in the unlicensed spectrum may include dual connectivity (DC) operation and the standalone LTE system in the unlicensed spectrum, according to which LTE-based technology solely operates in unlicensed spectrum without the use of an "anchor" in the licensed spectrum, called Multe-Fire. Further enhanced operation of LTE systems in the licensed as well as unlicensed spectrum is expected in future releases and 5G systems. Such enhanced operations can include techniques for sidelink resource allocation and UE processing behaviors for NR sidelink V2X communications.

An NG system architecture can include the RAN 110 and a 5G network core (5GC) 120. The NG-RAN 110 can include a plurality of nodes, such as gNBs and NG-eNBs. The core network 120 (e.g., a 5G core network or 5GC) can include an access and mobility function (AMF) and/or a user plane function (UPF). The AMF and the UPF can be communicatively coupled to the gNBs and the NG-eNBs via NG interfaces. More specifically, in some aspects, the gNBs and the NG-eNBs can be connected to the AMF by NG-C interfaces, and to the UPF by NG-U interfaces. The gNBs and the NG-eNBs can be coupled to each other via Xn interfaces.

In some aspects, the NG system architecture can use reference points (also referred to as interfaces) between various nodes as provided by 3GPP Technical Specification (TS) 23.501 (e.g., V15.4.0, 2018-12). In some aspects, each of the gNBs and the NG-eNBs can be implemented as a base station, a mobile edge server, a small cell, a home eNB, and so forth. In some aspects, a gNB can be a master node (MN) and NG-eNB can be a secondary node (SN) in a 5G architecture.

Figure 1B:
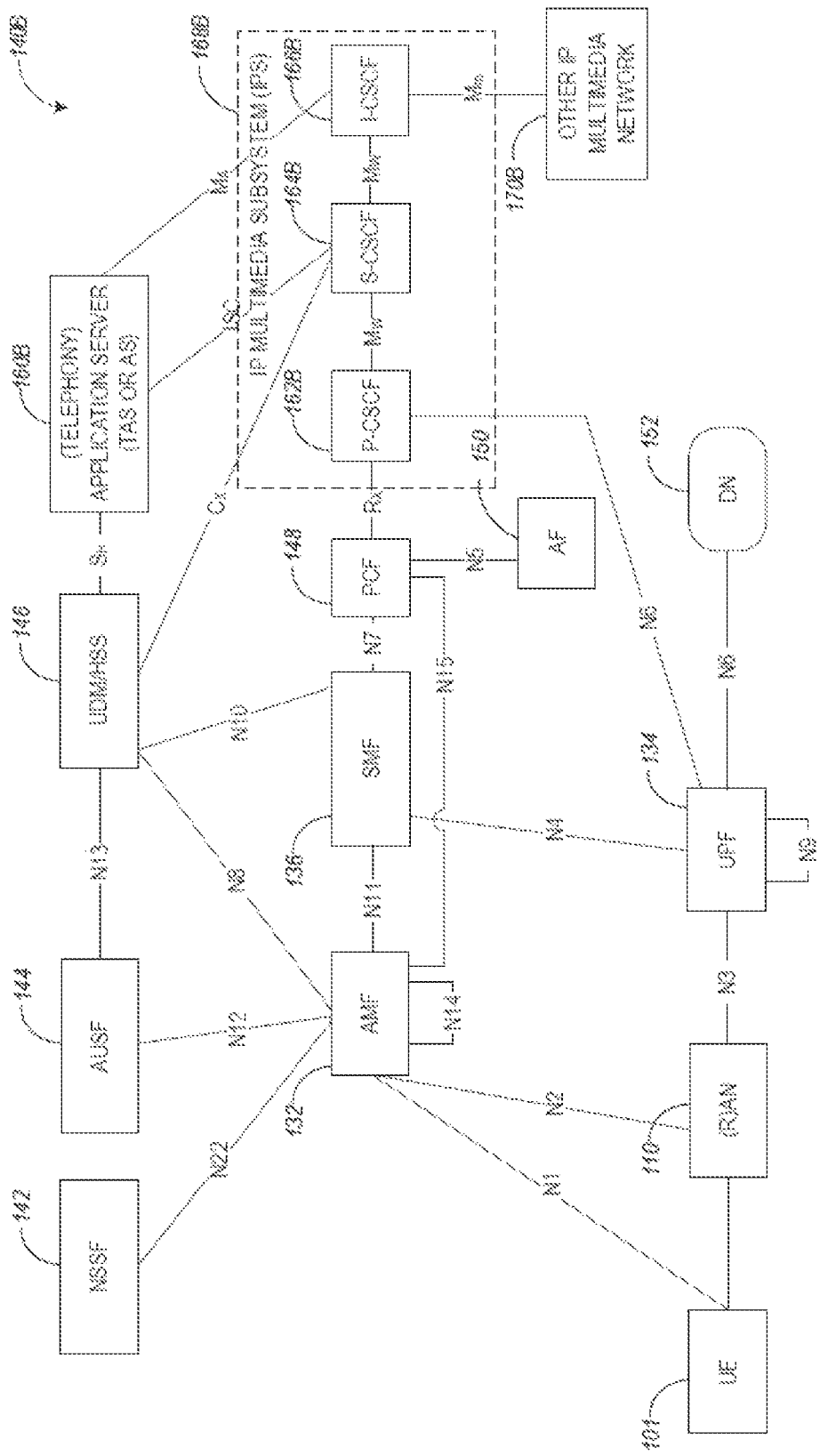
FIG. 1B illustrates a non-roaming 5G system architecture in accordance with some aspects.

FIG. 1B illustrates a non-roaming 5G system architecture in accordance with some aspects. In particular, FIG. 1B illustrates a 5G system architecture 140B in a reference point representation. More specifically. UE 102 can be in communication with RAN 110 as well as one or more other 5GC network entities. The 5G system architecture 140B includes a plurality of network functions (NFs), such as an AMF 132, session management function (SMF) 136, policy control function (PCF) 148, application function (AF) 150, UPF 134, network slice selection function (NSSF) 142, authentication server function (AUSF) 144, and unified data management (UDM)/home subscriber server (HSS) 146.

The UPF 134 can provide a connection to a data network (DN) 152, which can include, for example, operator services, Internet access, or third-party services. The AMF 132 can be used to manage access control and mobility and can also include network slice selection functionality. The AMF 132 may provide UE-based authentication, authorization, mobility management, etc., and may be independent of the access technologies. The SMF 136 can be configured to set up and manage various sessions according to network policy. The SMF 136 may thus be responsible for session management and allocation of IP addresses to UEs. The SMF 136 may also select and control the UPF 134 for data transfer. The SMF 136 may be associated with a single session of a UE 101 or multiple sessions of the UE 101. This is to say that the UE 101 may have multiple 5G sessions. Different SMFs may be allocated to each session. The use of different SMFs may permit each session to be individually managed. As a consequence, the functionalities of each session may be independent of each other.

The UPF 134 can be deployed in one or more configurations according to the desired service type and may be connected with a data network. The PCF 148 can be configured to provide a policy framework using network slicing, mobility management, and roaming (similar to PCRF in a 4G communication system). The UDM can be configured to store subscriber profiles and data (similar to an HSS in a 4G communication system).

The AF 150 may provide information on the packet flow to the PCF 148 responsible for policy control to support a desired QoS. The PCF 148 may set mobility and session management policies for the UE 101. To this end, the PCF 148 may use the packet flow information to determine the appropriate policies for proper operation of the AMF 132 and SMF 136. The AUSF 144 may store data for UE authentication.

In some aspects, the 5G system architecture 140B includes an IP multimedia subsystem (IMS) 168B as well as a plurality of IP multimedia core network subsystem entities, such as call session control functions (CSCFs). More specifically, the IMS 168B includes a CSCF, which can act as a proxy CSCF (P-CSCF) 162BE, a serving CSCF (S-CSCF) 164B, an emergency CSCF (E-CSCF) (not illustrated in FIG. 1B), or interrogating CSCF (I-CSCF) 166B. The P-CSCF 162B can be configured to be the first contact point for the UE 102 within the IM subsystem (IMS) 168B. The S-CSCF 164B can be configured to handle the session states in the network, and the E-CSCF can be configured to handle certain aspects of emergency sessions such as routing an emergency request to the correct emergency center or PSAP. The I-CSCF 166B can be configured to function as the contact point within an operator's network for all IMS connections destined to a subscriber of that network operator, or a roaming subscriber currently located within that network operator's service area. In some aspects, the I-CSCF 166B can be connected to another IP multimedia network 170E, e.g. an IMS operated by a different network operator.

In some aspects, the UDM/HSS 146 can be coupled to an application server 160E, which can include a telephony application server (TAS) or another application server (AS). The AS 160B can be coupled to the IMS 168B via the S-CSCF 164B or the I-CSCF 166B.

A reference point representation shows that interaction can exist between corresponding NF services. For example, FIG. 1B illustrates the following reference points: N1 (between the UE 102 and the AMF 132), N2 (between the RAN 110 and the AMF 132), N3 (between the RAN 110 and UPF 134), N4 (between the SMF 136 and the UPF 134), N5 (between the PCF 148 and the AF 150, not shown), N6 (between the UPF 134 and the DN 152), N7 (between the SMF 136 and the PCF 148, not shown). N8 (between the UDM 146 and the AMF 132, not shown). N9 (between two UPFs 134, not shown). N10 (between the UDM 146 and the SMF 136, not shown), N11 (between the AMF 132 and the SMF 136, not shown), N12 (between the AUSF 144 and the AMF 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMFs, not shown), and N22 (between AMF 132 and NSSF 142, not shown). Other reference point representations not shown in FIG. 1E can also be used.

Figure 1C:
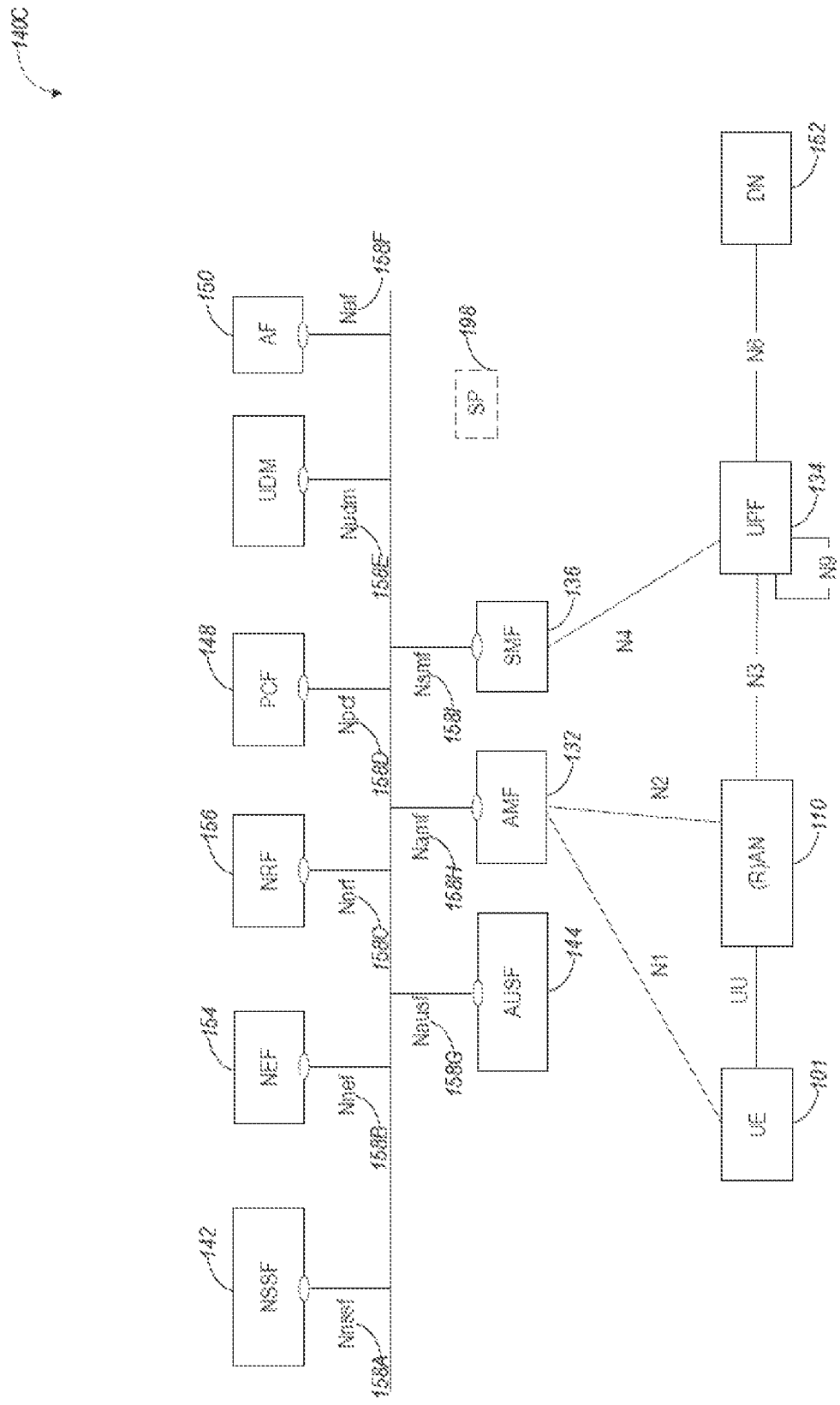
FIG. 1C illustrates a non-roaming 5G system architecture in accordance with some aspects.

FIG. 1C illustrates a 5G system architecture 140C and a service-based representation. In addition to the network entities illustrated in FIG. 1B, system architecture 140C can also include a network exposure function (NEF) 154 and a network repository function (NRF) 156. In some aspects, 5G system architectures can be service-based and interaction between network functions can be represented by corresponding point-to-point reference points Ni or as service-based interfaces.

In some aspects, as illustrated in FIG. 1C, service-based representations can be used to represent network functions within the control plane that enable other authorized network functions to access their services. In this regard, 5G system architecture 140C can include the following service-based interfaces: Namf 158H (a service-based interface exhibited by the AMF 132), Nsmf 158I (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1C can also be used.

NR-V2X architectures may support high-reliability low latency sidelink communications with a variety of traffic patterns, including periodic and aperiodic communications with random packet arrival time and size. Techniques disclosed herein can be used for supporting high reliability in distributed communication systems with dynamic topologies, including sidelink NR V2X communication systems.

Figure 2:
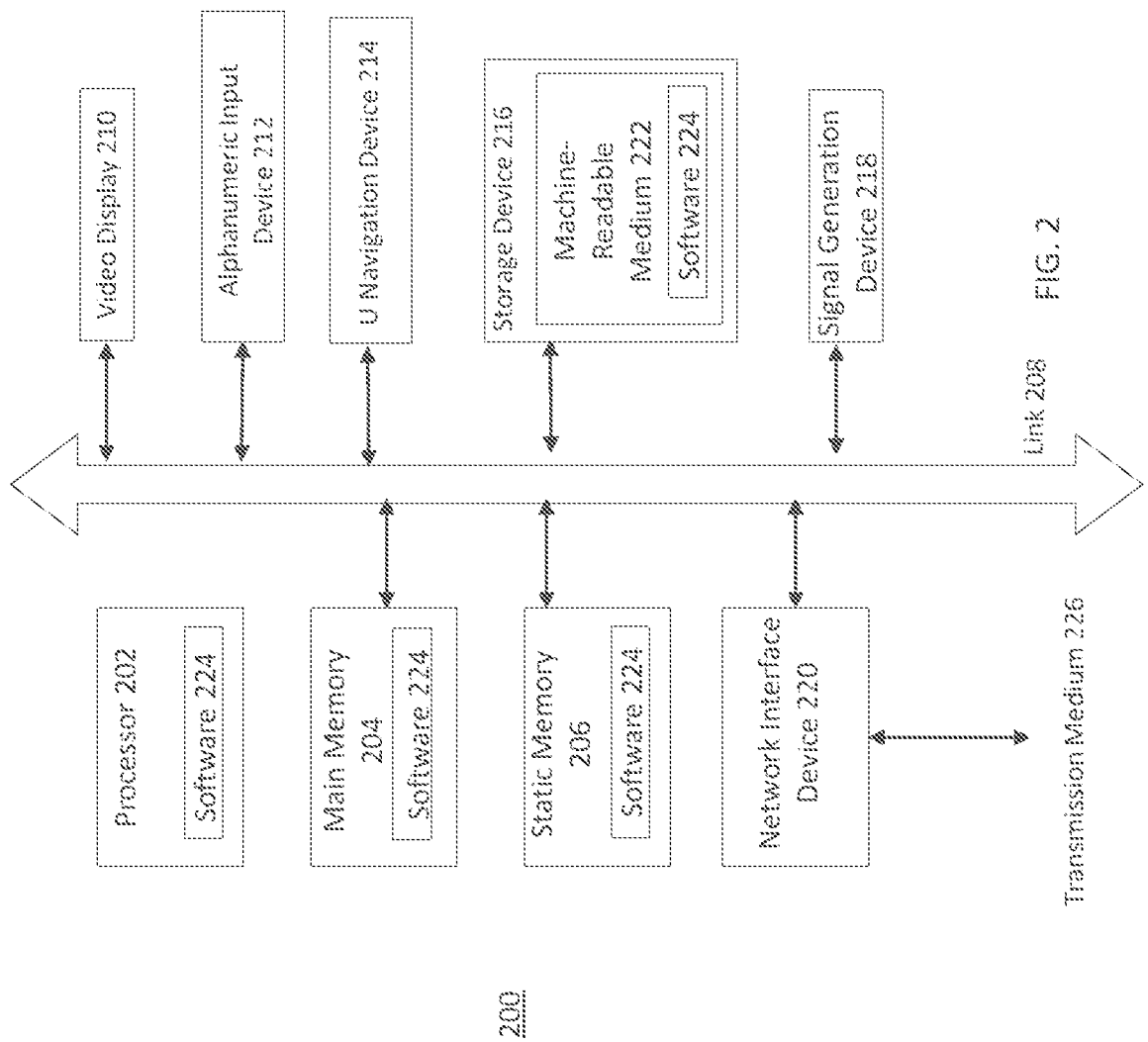
FIG. 2 illustrates a block diagram of a communication device in accordance with some embodiments.

FIG. 2 illustrates a block diagram of a communication device in accordance with some embodiments. The communication device 200 may be a UE such as a specialized computer, a personal or laptop computer (PC), a tablet PC, or a smart phone, dedicated network equipment such as an eNB, a server running software to configure the server to operate as a network device, a virtual device, or any machine capable of executing instructions (sequential or otherwise) that specify actions to be taken by that machine. For example, the communication device 200 may be implemented as one or more of the devices shown in FIG. 1. Note that communications described herein may be encoded before transmission by the transmitting entity (e.g., UE, gNB) for reception by the receiving entity (e.g., gNB, UE) and decoded after reception by the receiving entity.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The communication device 200 may include a hardware processor (or equivalently processing circuitry) 202 (e.g., a central processing unit (CPU), a GPU, a hardware processor core, or any combination thereof), a main memory 204 and a static memory 206, some or all of which may communicate with each other via an interlink (e.g., bus) 208. The main memory 204 may contain any or all of removable storage and non-removable storage, volatile memory or non-volatile memory. The communication device 200 may further include a display unit 210 such as a video display, an alphanumeric input device 212 (e.g., a keyboard), and a user interface (UI) navigation device 214 (e.g., a mouse). In an example, the display unit 210, input device 212 and UI navigation device 214 may be a touch screen display. The communication device 200 may additionally include a storage device (e.g., drive unit) 216, a signal generation device 218 (e.g., a speaker), a network interface device 220, and one or more sensors, such as a global positioning system (GPS) sensor, compass, accelerometer, or other sensor. The communication device 200 may further include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a non-transitory machine readable medium 222 (hereinafter simply referred to as machine readable medium) on which is stored one or more sets of data structures or instructions 224 (e.g., software) embodying or utilized by any one or more of the techniques or functions described herein. The instructions 224 may also reside, completely or at least partially, within the main memory 204, within static memory 206, and/or within the hardware processor 202 during execution thereof by the communication device 200. While the machine readable medium 222 is illustrated as a single medium, the term "machine readable medium" may include a single medium or multiple media (e.g., a centralized or distributed database, and/or associated caches and servers) configured to store the one or more instructions 224.

The term "machine readable medium" may include any medium that is capable of storing, encoding, or carrying instructions for execution by the communication device 200 and that cause the communication device 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Radio access Memory (RAM); and CD-ROM and DVD-ROM disks.

The instructions 224 may further be transmitted or received over a communications network using a transmission medium 226 via the network interface device 220 utilizing any one of a number of wireless local area network (WLAN) transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks. Communications over the networks may include one or more different protocols, such as Institute of Electrical and Electronics Engineers (IEEE) 802.11 family of standards known as Wi-Fi, IEEE 802.16 family of standards known as WiMax, IEEE 802.15.4 family of standards, a Long Term Evolution (LTE) family of standards, a Universal Mobile Telecommunications System (UMTS) family of standards, peer-to-peer (P2P) networks, a next generation (NG)/5$^{th}$ generation (5G) standards among others. In an example, the network interface device 220 may include one or more physical jacks (e.g., Ethernet, coaxial, or phone jacks) or one or more antennas to connect to the transmission medium 226.

Note that the term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" or "processor" as used herein thus refers to, is part of, or includes circuitry capable of sequentially and automatically carrying out a sequence of arithmetic or logical operations, or recording, storing, and/or transferring digital data. The term "processor circuitry" or "processor" may refer to one or more application processors, one or more baseband processors, a physical central processing unit (CPU), a single- or multi-core processor, and/or any other device capable of executing or otherwise operating computer-executable instructions, such as program code, software modules, and/or functional processes.

As above, one of the issues in a 5G network is monitoring various aspects associated with the packet. QoS monitoring is one such aspect. The QoS monitoring of an UL-DL packet in a 5G network can be performed per QoS flow per UE level for ultra-reliable low-latency communication (URLLC) services, subject to the operators' configuration (see 3GPP TS 23.501). The QoS monitoring is activated by the SMF towards the packet data unit (PDU) session anchor (PSA) UPF for the QoS Flow during the PDU Session Establishment or Modification procedure. The GPRS Tunneling Protocol (GTP) user plane (GTP-U) path QoS Monitoring can be performed in 5G network, subject to operators' configuration (see 3GPP TS 23.501). The GTP-U path QoS monitoring is activated by the SMF to UPFs and the NG-RAN.

5.3.x QFQoSMonitoringControl 5.3.x.1 Definition

This IOC specifies the capabilities and properties for control of QoS monitoring per QoS flow per UE for URLLC service. For more information about QoS monitoring per QoS flow per UE, see 3GPP TS 23.501.

If the QoS monitoring per QoS flow per UE is enabled, the SMF requests the PSA UPF to perform the QoS monitoring per QoS flow per UE based on the attributes of the instance of this IOC.

5.3.x.2 Attributes

| Attribute name | Support Qualifier | isReadable | isWritable | isInvariant | isNotifyable |
| --- | --- | --- | --- | --- | --- |
| qFQoSMonitoringState | M | T | T | F | T |
| qFMonitoredSNSSAIs | M | T | T | F | T |
| qFMonitored5QIs | M | T | T | F | T |
| isEventTriggeredQFMonitoringSupported | M | T | F | F | T |
| isPeriodicQFMonitoringSupported | M | T | F | F | T |
| isSessionReleasedQFMonitoringSupported | M | T | F | F | T |
| qFPacketDelayThresholds | CM | T | T | F | T |
| qFMinimumWaitTime | CM | T | T | F | T |
| qFMeasurementPeriod | CM | T | T | F | T |

5.3.x.3 Attribute Constraints

| Name | Definition |
| --- | --- |
| qFPacketDelayThresholds Support Qualifier | Condition: isEventTriggeredQFMonitoringSupported attribute of the same MOI is set to "Yes". |
| qFMinimumWaitTime Support Qualifier | Condition: isEventTriggeredQFMonitoringSupported attribute of the same MOI is set to "Yes". |
| qFMeasurementPeriod Support Qualifier | Condition: isPeriodicQFMonitoringSupported attribute of the same MOI is set to "Yes". |

5.3.x.4 Notifications

The common notifications defined in subclause 5.5 are valid for this IOC, without exceptions or additions.

5.3.y GtpUPathQoSMonitoringControl 5.3.v.1 Definition

This IOC specifies the capabilities and properties for control of GTP-U path QoS monitoring. For more information about the GTP-U path QoS monitoring, see 3GPP TS 23.501.

If the GTP-U path QoS monitoring is enabled, the SMF requests the UPF(s) and NG-RAN to perform the GTP-U path QoS monitoring based on the attributes of the instance of this IOC.

5.3.y.2 Attributes

| Attribute name | Support Qualifier | isReadable | isWritable | isInvariant | isNotifyable |
|---|---|---|---|---|---|
| gtpUPathQoSMonitoringState | M | T | T | F | T |
| gtpUPathMonitoredSNSSAIs | M | T | T | F | T |
| monitoredDSCPs | M | T | T | F | T |
| isEventTriggeredGtpUPathMonitoringSupported | M | T | F | F | T |
| isPeriodicGtpUMonitoringSupported | M | T | F | F | T |
| isImmediateGtpUMonitoringSupported | M | T | F | F | T |
| gtpUPathDelayThresholds | CM | T | T | F | T |
| gtpUPathMinimumWaitTime | CM | T | T | F | T |
| gtpUPathMeasurementPeriod | CM | T | T | F | T |

5.3.y.3 Attribute Constraints

| Name | Definition |
|---|---|
| gtpUPathDelayThresholds Support Qualifier | Condition: isEventTriggeredGtpUPathMonitoringSupported attribute of the same MOI is set to "Yes". |
| gtpUPathMinimumWaitTime Support Qualifier | Condition: isEventTriggeredGtpUPathMonitoringSupported attribute of the same MOI is set to "Yes". |
| gtpUPathMeasurementPeriod Support Qualifier | Condition: isPeriodicGtpUMonitoringSupported attribute of the same MOI is set to "Yes". |

5.3.y.4 Notifications

The common notifications defined in subclause 5.5 are valid for this IOC, without exceptions or additions.

5.3.z gtpUPathDelayThresholdsType FdaTaType>

5.3.z.1 Definition

This datatype specifies the thresholds for reporting the packet delay for GTP-U path QoS monitoring, see TS 29.244.

5.3.z.2 Attributes

| Attribute name | Support Qualifier | isReadable | isWritable | isInvariant | isNotifyable |
|---|---|---|---|---|---|
| N3AveragePacketDelayThreshold | M | T | T | F | T |
| N3MinPacketDelay Threshold | M | T | T | F | T |
| N3MaxPacketDelay Threshold | M | T | T | F | T |
| N9AveragePacketDelayThreshold | M | T | T | F | T |
| N9MinPacketDelayThreshold | M | T | T | F | T |
| N9MaxPacketDelayThreshold | M | T | T | F | T |

5.3.z.3 Attribute Constraints: None
5.3.z.4 Notifications
The subclause 4.5 (of 3GPP TS 28.541) of the «IOC» using this «dataType» as one of its attributes, shall be applicable.

Figure 3:
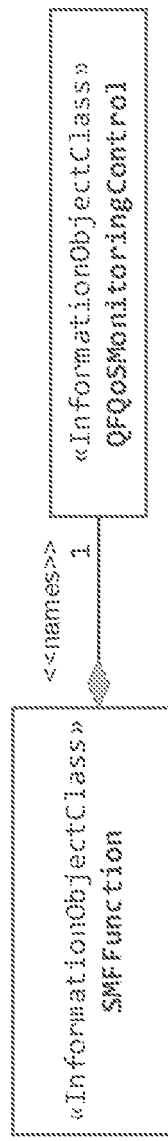
FIG. 3 illustrates a QoS monitoring control fragment in accordance with some embodiments.

FIG. 3 illustrates a QoS monitoring control fragment in accordance with some embodiments. Specifically, FIG. 3 shows the fragment of control QoS monitoring per QoS flow per UE.

Figure 4:
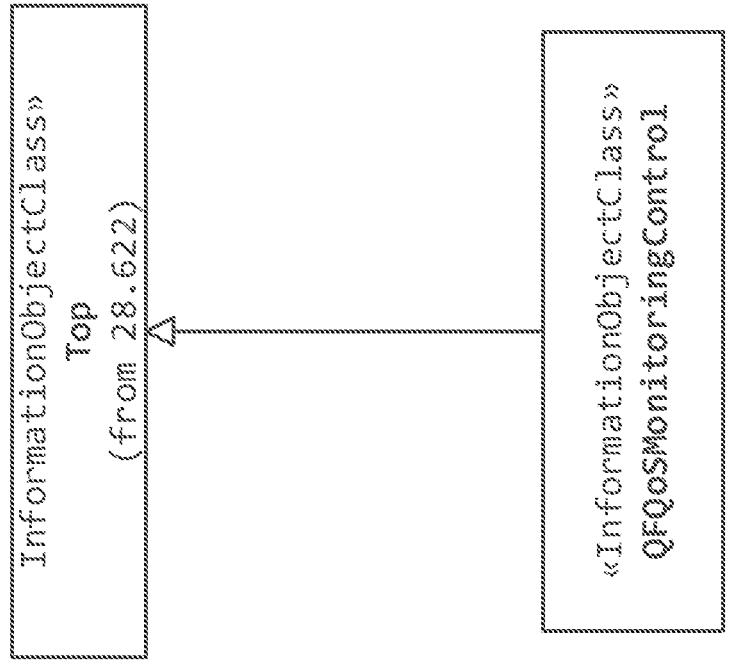
FIG. 4 illustrates an inheritance hierarchy for Information Object Class (IOC) QFQoSMonitoringControl generation in accordance with some embodiments.
Figure 5:
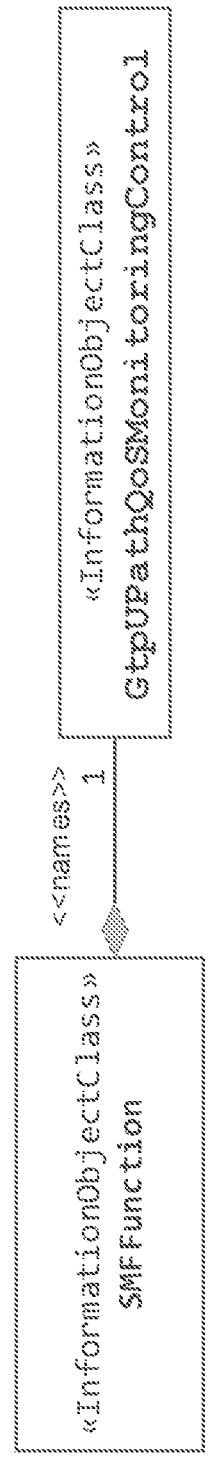
FIG. 5 illustrates a transport view of a Network Data Analytics Function (NWDAF) Network Resource Models (NRM) in accordance with some embodiments.
Figure 6:
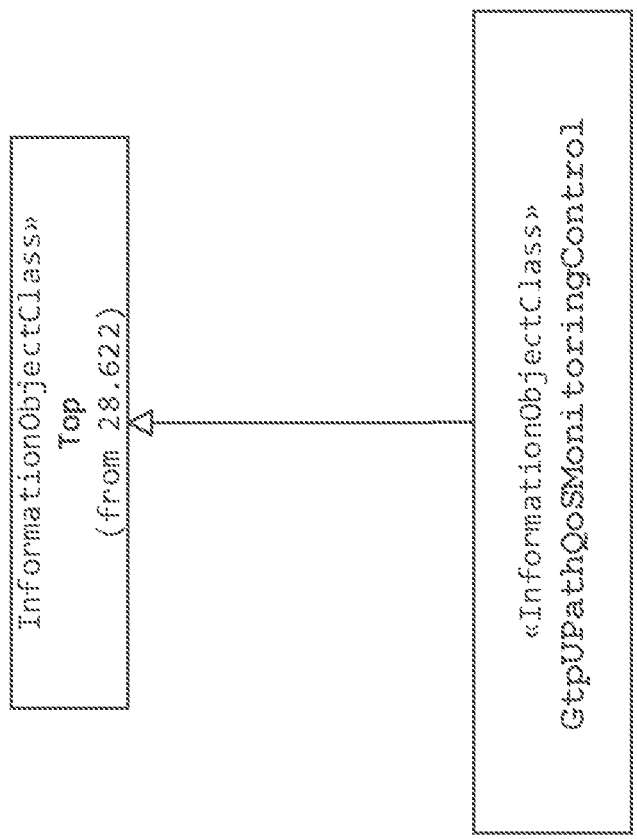
FIG. 6 illustrates an inheritance hierarchy for IOC GtpU-PathQoSMonitoringControl in accordance with some embodiments.

FIG. 4 illustrates an inheritance hierarchy for Information Object Class (IOC) QFQoSMonitoringControl generation in accordance with some embodiments. FIG. 4 shows the fragment of GTP-U path QoS monitoring control. FIG. 5 illustrates a transport view of a Network Data Analytics Function (NWDAF) Network Resource Models (NRM) in accordance with some embodiments. FIG. 6 illustrates an inheritance hierarchy for IOC GtpUPathQoSMonitoringControl in accordance with some embodiments.

5.4.1 Attribute Properties

The following table defines the attributes that are present in several Information Object Classes (IOCs) of the present document.

| Attribute Name | Documentation and Allowed Values | Properties |
|---|---|---|
| qFQoSMonitoringState | It indicates the state of QoS monitoring per QoS flow per UE for URLLC service. allowed Values: "Enabled", "Disabled". | type: ENUM multiplicity: 1 isOrdered: N/A isUnique: N/A default Value: Enabled isNullable: False |
| qFMonitoredSNSSAIs | It specifies the S-NSSAIs for which the QoS monitoring per QoS flow per UE is to be performed. allowedValues: See 3GPP TS 23.003 [13] | type: S-NSSAI multiplicity: * isOrdered: N/A isUnique: N/A default Value: None isNullable: False |
| qFMonitored5QIs | It specifies the 5QIs for which the QoS monitoring per QoS flow per UE is to be performed. allowedValues: See 3GPP TS 23.501[2] | type: Integer multiplicity: * isOrdered: N/A isUnique: N/A default Value: None isNullable: False |
| isEventTriggeredQFMonitoringSupported | It indicates whether the event based QoS monitoring reporting per QoS flow per UE is supported, see 3GPP TS 29.244 [x]. allowedValues: "Yes", "No". | type: Boolean multiplicity : 1 isOrdered: N/A isUnique: N/A default Value: Yes isNullable: False |
| isPeriodicQFMonitoringSupported | It indicates whether the periodic QoS monitoring reporting per QoS flow per UE is supported, see 3GPP TS 29.244 [x]. allowed Values: "Yes", "No". | type: Boolean multiplicity: 1 isOrdered: N/A isUnique: N/A default Value: Yes isNullable: False |
| isSessionReleasedQFMonitoringSupported | It indicates whether the session release based QoS monitoring reporting per QoS flow per UE is supported, see 3GPP TS 29.244 [x]. allowed Values: "Yes", "No". | type: Boolean multiplicity: 1 isOrdered: N/A isUnique: N/A default Value: Yes isNullable: False |
| qFPacketDelayThresholds | It specifies the thresholds for reporting the packet delay between PSA and UE for QoS monitoring per QoS flow per UE, if the isEventTriggeredQFMonitoringSupported attribute of the same MOI is set to "yes".". The packet delay will be reported by PSA UPF to SMF when it exceeds the threshold (in milliseconds). It contains the following elements: ThresholdDl, indicating the threshold for DL delay between PSA UPF and UE; TresholUl, indicating the threshold for UL delay between PSA UPF and UE: ThresholdRtt, indicating the threshold for round-trip delay between PSA UPF and UE. allowedValues: see 3GPP TS 29.244 [x]. | type: Integer multiplicity: * isOrdered: Y isUnique: N/A default Value: None isNullable: False |

-continued

| Attribute Name | Documentation and Allowed Values | Properties |
|---|---|---|
| qPMinimumWaitTime | It specifies the minimum waiting time (in seconds) between two consecutive reports for event triggered QoS monitoring reporting per QoS flow per UE, if the isEventTriggeredQFMonitoringSupported attribute of the same MOI is set to "yes". allowed Values: see 3GPP TS 29.244 [x]. | type: Integer multiplicity: 1 isOrdered: N/A isUnique: N/A default Value: None isNullable: False |
| qFMeasurementPeriod | It specifies the period (in seconds) for reporting the packet delay for QoS monitoring per QoS flow per UE, if the isPeriodicQFMonitoringSupported attribute of the same MOI is set to "yes". allowedValues: see 3GPP TS 29.244 [x]. | type: Integer multiplicity: 1 isOrdered: N/A isUnique: N/A default Value: None isNullable: False |
| gtpUPathQoSMonitoringState | It indicates the state of GTP-U path QoS monitoring for URLLC service. allowed Values: "Enabled", "Disabled". | type: ENUM multiplicity: 1 isOrdered: N/A isUnique: N/A default Value: Enabled isNullable: False |
| gtpUPathMonitoredSNSSAIs | It specifies the S-NSSAIs for which the GTP-U path QoS monitoring is to be performed. allowed Values: See 3GPP TS 23.003 [13] | type: S-NSSAI multiplicity: * isOrdered: N/A isUnique: N/A default Value: None isNullable: False |
| monitoredDSCPs | It specifies the DSCPs for which the GTP-U path QoS monitoring is to be performed. allowedValues: See 3GPP TS 29.244 [x] | type: Integer multiplicity: * isOrdered: N/A isUnique: N/A default Value: None isNullable: False |
| isEventTriggeredGtpUPathMonitoringSupported | It indicates whether the event triggered GTP-U path QoS monitoring reporting based on thresholds is supported, see 3GPP TS 29.244 [x]. allowedValues: "Yes", "No". | type: Boolean multiplicity: 1 isOrdered: N/A isUnique: N/A default Value: Yes isNullable: False |
| isPeriodicGtpUMonitoringSupported | It indicates whether the periodic GTP-U path QoS monitoring reporting is supported, see 3GPP TS 29.244 [x]. allowedValues: "Yes", "No". | type: Boolean multiplicity: 1 isOrdered: N/A isUnique: N/A default Value: Yes isNullable: False |
| isImmediateGtpUMonitoringSupported | It indicates whether the immediate GTP-U path QoS monitoring reporting is supported, see 3GPP TS 29.244 [x]. allowed Values: "Yes", "No". | type: Boolean multiplicity: 1 isOrdered: N/A isUnique: N/A default Value: Yes isNullable: False |
| gtpUPathDelayThresholds | It specifies the thresholds for reporting the packet delay for the GTO-U path QoS monitoring, if the isEventTriggeredGtpUPathMonitoringSupported attribute of the same MOI is set to "yes". The packet delay will be reported to SMF when it exceeds the threshold (in milliseconds). allowedValues: N/A. | type: gtpUPathDelayThresholdsType multiplicity: 1 isOrdered: Y isUnique: N/A default Value: None isNullable: False |

| Attribute Name | Documentation and Allowed Values | Properties |
| --- | --- | --- |
| gtpUPathMinimumWaitTime | It specifies the minimum waiting time (in seconds) between two consecutive reports for event triggered GTP-U path QoS monitoring reporting, if the isEventTriggeredGtpUPathMonit oringSupported attribute of the same MOI is set to "yes". allowedValues: see 3GPP TS 29.244 [x]. | type: Integer multiplicity: 1 isOrdered: N/A isUnique: N/A default Value: None isNullable: False |
| gtpUPathMeasurementPeriod | It specifies the period (in seconds) for reporting the packet delay for GTP-U path QoS monitoring, if the isPeriodicGtpUMonitoringSupported attribute of the same MOI is set to "yes". allowed Values: see 3GPP TS 29.244 [x]. | type: Integer multiplicity: 1 isOrdered: N/A isUnique: N/A default Value: None isNullable: False |
| N3AveragePacketDelayThreshold | It specifies the threshold for reporting the average packet delay of a GTP-U path on N3 interface. allowedValues: see 3GPP TS 29.244 [x] | type: Integer multiplicity: 1 isOrdered: N/A isUnique: N/A default Value: None isNullable: False |
| N3MinPacketDelayThreshold | It specifies the threshold for reporting the minimum packet delay of a GTP-U path on N3 interface. allowed Values: see 3GPP TS 29.244 [x] | type: Integer multiplicity: 1 isOrdered: N/A isUnique: N/A default Value: None isNullable: False |
| N3MaxPacketDelayThreshold | It specifies the threshold for reporting the maxinum packet delay of a GTP-U path on N3 interface. allowedValues: see 3GPP TS 29.244 [x] | type: Integer multiplicity: 1 isOrdered: N/A isUnique: N/A default Value: None isNullable: False |
| N9AveragePacketDelayThreshold | It specifies the threshold for reporting the average packet delay of a GTP-U path on N9 interface. allowedValues: see 3GPP TS 29.244 [x]. | type: Integer multiplicity: 1 isOrdered: N/A isUnique: N/A default Value: None isNullable: False |
| N9MinPacketDelayThreshold | It specifies the threshold for reporting the minimum packet delay of a GTP-U path on N9 interface, allowedValues: see 3 GPP TS 29.244 [x]. | type: Integer multiplicity: 1 isOrdered: N/A isUnique: N/A default Value: None isNullable: False |
| N9MaxPacketDelayThreshold | It specifies the threshold for reporting the maxinum packet delay of a GTP-U path on N9 interface. allowedValues: see 3GPP TS 29.244 [x] | type: Integer multiplicity: 1 isOrdered: N/A isUnique: N/A default Value: None isNullable: False |

To perform the following measurements with subcounters per DSCP, to be captured in 3GPP TS 28.552.

5.4.1.5 Data Volume of Incoming GTP Data Packets Per QoS Level on the N3 Interface, from the (R)AN to the UPF
 a) This measurement provides the data volume of the incoming GTP data packets per QoS level which have been accepted and processed by the GTP-U protocol entity on the N3 interface. The measurement is calculated and split into subcounters per Differentiated Services Code Point (DSCP).
 b) CC.
 c) This measurement is obtained by counting the number of GTP PDU bits sent from the gNB to the UPF on the N3 interface. The measurement is performed per DSCP.
 d) Each measurement is an integer value representing the number of bits measured in kbit. The number of measurements is equal to the number of DSCPs.
 e) GTP.InDataVolumeQoSLevelN3UPF.DSCP, where DSCP identifies DSCP.
 f) EP_N3.
 g) Valid for packet switching.
 h) 5GS.

5.4.1.6 Data Volume of Outgoing GTP Data Packets Per QoS Level on the N3 Interface, from the UPF to the (R)AN
 a) This measurement provides the data volume of the outgoing GTP data packets per QoS level which have been generated by the GTP-U protocol entity on the N3 interface. The measurement is calculated and split into subcounters per DSCP.
 b) CC.
 c) This measurement is obtained by counting the number of GTP PDU bits sent from UPF to GNB on the N3 interface. The measurement is performed per DSCP.

d) Each measurement is an integer value representing the number of bits measured in kbit. The number of measurements is equal to the number of DSCPs.
e) GTP.OutDataVolumeQoSLevelN3UPF.DSCP, where DSCP identifies DSCP.
f) EP_N3.
g) Valid for packet switching.
h) 5GS.

5.4.1.7 Incoming GTP Data Packet Loss
a) This measurement provides the number of GTP data packets that are not successfully received at the UPF. It is a measure of the incoming GTP data packet loss per N3 on an UPF interface. The measurement is split into subcounters per DSCP.
b) CC.
c) This measurement is obtained by a counter: Number of missing incoming GTP sequence numbers (3GPP TS 29.281) among all GTP packets delivered by a gNB to an UPF interface. Separate subcounters are maintained for each DSCP.
d) Each measurement is an integer value representing the number of lost GTP packets. The number of measurements is equal to the number of DSCPs.
e) GTP.InDataPktPacketLossN3UPF.DSCP, where DSCP identifies the DSCP.
f) EP_N3.
g) Valid for packet switched traffic.
h) 5GS.

5.4.1.10 Number of Incoming GTP Data Packets Out-of-Order on the N3 Interface, from the (R)AN to the UPF
a) This measurement provides the number of incoming GTP data packets out-of-order on the N3 interface. The measurement is calculated and split into sub-counters per DSCP.
b) CC
c) This measurement is obtained by counting the number of GTP data packets with sequence numbers less than the maximum GTP sequence number received by UPF. Separate subcounters are maintained for each DSCP.
d) Each measurement is an integer value representing the number of GTP packets out-of-order. The number of measurements is equal to the number of DSCPs.
e) GTP.InDataPktDisorderN3UPF.DSCP where DSCP identifies the DSCP.
f) EP_N3
g) Valid for packet switching
h) 5GS 5.4.5 GTP Packets Delay in UPF
5.4.5.1 DL GTP Packets Delay in UPF
5.4.5.1.1 Average DL GTP Packets Delay in PSA UPF
a) This Measurement Provides the Average (Arithmetic Mean) DL GTP packets delay within the PSA UPF. The measurement is split into subcounters per DSCP.
b) DER (n=1).
c) This measurement is obtained as: 1) sampling the DL GTP PDUs (the sampling rate may be vendor specific) for this measurement, 2) sum of (time when sending the sampled DL GTP PDU to the gNB-CU-UP or I-UPF at the PSA UPF's egress GTP termination, minus time of arrival of the same packet at the PSA UPF's ingress IP termination for the N6 interface) divided by total number of sampled DL GTP PDUs sent to the gNB-CU-UP or I-UPF. The measurement is calculated per DSCP.
d) Each measurement is an integer representing the mean delay in microseconds.
e) GTP.DelayDlInPsaUpfMean.DSCP, where DSCP identifies the DSCP.
f) UPFFunction.
g) Valid for packet switched traffic.
h) 5GS.

5.4.5.1.2 Distribution of DL GTP Packets Delay in PSA UPF
a) This measurement provides the distribution of DL GTP packets delay within the PSA UPF. The measurement is split into subcounters per DSCP.
b) DER (n=1).
c) This measurement is obtained by 1) sampling the DL GTP PDUs (the sampling rate may be vendor specific) for this measurement, 2) calculating the DL delay for the sampled GTP PDU in the I-UPF by: the time when sending the sampled DL GTP PDU to the gNB-CU-UP or I-UPF at the PSA UPF's egress GTP termination, minus time of arrival of the same packet at the PSA UPF's ingress IP termination for the N6 interface: and 3) incrementing the corresponding bin with the delay range where the result of 2) falls into by 1 for the subcounters per DSCP.
d) Each measurement is an integer representing the number of sampled DL GTP PDUs measured with the delay within the range of the bin.
e) GTP.DelayDlInPsaUpfDist.DSCP.Bin, where Bin indicates a delay range which may be vendor specific, and DSCP identifies the DSCP.
f) UPFFunction.
g) Valid for packet switched traffic.
h) 5GS.

5.4.5.1.3 Average DL GTP Packets Delay in I-UPF
a) This measurement provides the average (arithmetic mean) DL GTP packets delay within the I-UPF. The measurement is split into subcounters per DSCP.
b) DER (n=1).
c) This measurement is obtained as: 1) sampling the DL GTP PDUs (the sampling rate may be vendor specific) for this measurement, 2) sum of (the time when sending the sampled DL GTP PDU to the gNB-CU-UP at the I-UPF's egress GTP termination, minus the time of arrival of the same packet at the I-UPF's ingress GTP termination for the N9 interface) divided by the total number of sampled DL GTP PDUs sent to the gNB-CU-UP. The measurement is calculated per DSCP.
d) Each measurement is an integer representing the mean delay in microseconds.
e) GTP.DelayDlIniUpfMean.DSCP, where DSCP identifies the DSCP.
f) UPFFunction.
g) Valid for packet switched traffic.
h) 5GS.

5.4.5.1.4 Distribution of DL GTP Packets Delay in I-UPF
a) This measurement provides the distribution of DL GTP packets delay within the I-UPF. The measurement is split into subcounters per DSCP.
b) DER (n=1).
c) This measurement is obtained by 1) sampling the DL GTP PDUs (the sampling rate may be vendor specific) for this measurement, 2) calculating the DL delay for the sampled GTP PDU in the I-UPF by: the time when sending the DL GTP PDU to the gNB-CU-UP at the I-UPF's egress GTP termination, minus the time of arrival of the same packet at the I-UPF's ingress GTP termination for the N9 interface; and 3) incrementing the corresponding bin with the delay range where the result of 2) falls into by 1 for the subcounters per DSCP.

d) Each measurement is an integer representing the number of sampled DL GTP PDUs measured with the delay within the range of the bin.
e) GTP.DelayDlInIUpfDist. DSCP.5QL, where Bin indicates a delay range which may be vendor specific, and DSCP identifies the DSCP.
f) UPFFunction.
g) Valid for packet switched traffic.
h) 5GS.

5.4.5.2 UL GTP Packets Delay in UPF
5.4.5.2.1 Average UL GTP Packets Delay in PSA UPF
a) This measurement provides the average (arithmetic mean) UL GTP packets delay within the PSA UPF. The measurement is split into subcounters per DSCP.
b) DER (n=1).
c) This measurement is obtained as: 1) sampling the UL GTP PDUs (the sampling rate may be vendor specific) for this measurement, 2) sum of (the time when sending the sampled UL data packet at the PSA UPF's egress IP termination for the N6 interface, minus the time of arrival of the corresponding GTP SDU from the N3 or N9 interface at the PSA UPF's ingress GTP termination) divided by the total number of sampled UL data packets sent to the N6 interface. The measurement is calculated per DSCP.
d) Each measurement is an integer representing the mean delay in microseconds.
e) GTP.DelayUlInPsaUpfMean.DSCP, where DSCP identifies the DSCP.
f) UPFFunction.
g) Valid for packet switched traffic.
h) 5GS.

5.4.5.2.2 Distribution of UL GTP Packets Delay in PSA UPF
a) This measurement provides the distribution of UL GTP packets delay within the PSA UPF. The measurement is split into subcounters per DSCP.
b) DER (n=1).
c) This measurement is obtained by 1) sampling the UL GTP PDUs (sampling rate may be vendor specific) for this measurement, 2) calculating the UL delay for a GTP PDU in I-UPF by, the time when sending the sampled UL data packet at the PSA UPF's egress IP termination for the N6 interface, minus the time of arrival of the corresponding GTP SDU from the N3 or N9 interface at the PSA UPF's ingress GTP termination; and 3) incrementing the corresponding bin with the delay range where the result of 2) falls into by 1 for the subcounters per DSCP.
d) Each measurement is an integer representing the number of sampled UL GTP PDUs measured with the delay within the range of the bin.
e) GTP.DelayUlInPsaUpfDist.DSCP.Bin, where Bin indicates a delay range which may be vendor specific, and DSCP identifies the DSCP.
f) UPFFunction.
g) Valid for packet switched traffic.
h) 5GS.

5.4.5.2.3 Average UL GTP Packets Delay in I-UPF
a) This measurement provides the average (arithmetic mean) UL GTP packets delay within the I-UPF. The measurement is split into subcounters per DSCP.
b) DER (n=1).
c) This measurement is obtained as, 1) sampling the UL GTP PDUs (the sampling rate may be vendor specific) for this measurement, 2) the sum of (the time when sending the sampled UL GTP PDU to the PSA UPF at the I-UPF's egress GTP termination, minus the time of arrival of the same packet from the N3 interface at I-UPF's ingress GTP termination) divided by the total number of sampled UL GTP PDUs sent to the PSA UPF. The measurement is calculated per DSCP.
d) Each measurement is an integer representing the mean delay in microseconds.
e) GTP.DelayUlInIUpfMean.DSCP, where DSCP identifies the DSCP.
f) UPFFunction.
g) Valid for packet switched traffic.
h) 5GS.

5.4.5.2.4 Distribution of UL GTP Packets Delay in I-UPF
a) This measurement provides the distribution of UL GTP packets delay within the I-UPF. The measurement is split into subcounters per DSCP.
b) DER (n=1).
c) This measurement is obtained by 1) sampling the UL GTP PDUs (the sampling rate may be vendor specific) for this measurement, 2) calculating the UL delay for a GTP PDU in I-UPF by: the time when sending the sampled UL GTP PDU to the PSA UPF at the I-UPF's egress GTP termination, minus the time of arrival of the same packet from the N3 interface at the I-UPF's ingress GTP termination; and 3) incrementing the corresponding bin with the delay range where the result of 2) falls into by 1 for the subcounters per DSCP.
d) Each measurement is an integer representing the number of sampled UL GTP PDUs measured with the delay within the range of the bin.
e) GTP.DelayUlInIUpfDist.DSCP.Bin, where Bin indicates a delay range which may be vendor specific, and DSCP identifies the DSCP.
f) UPFFunction.
g) Valid for packet switched traffic.
h) 5GS.

5.4.6 Round-Trip Packet Delay Between PSA UPF and UE
5.4.6.1 Average Round-Trip Packet Delay Between PSA UPF and UE
a) This measurement provides the average round-trip GTP packet delay between the PSA UPF and UE (including the UE processing time). This measurement is split into subcounters per DSCP. This measurement is only applicable to the case the PSA UPF and NG-RAN are not time synchronised.
b) DER (n=1).
c) The measurement is obtained by the following method:

For each DL GTP PDU (packet i) encapsulated with QoS Flow ID (QFI), tunnel endpoint identifier (TEID), sequence number and Quality Management Plan (QMP) indicator for QoS monitoring, the PSA UPF records the following time stamps and information (see 3GPP TS 23.501):

T1 that the DL GTP PDU was sent by the PSA UPF;
T6 that the corresponding UL GTP PDU (with QMP indicator and the corresponding sequence number) was received by the PSA UPF.

The DSCP associated to the DL GTP PDU.

The PSA UPF counts the number (N) of DL GTP PDUs encapsulated with QFI, TEID, sequence number and QMP indicator for each DSCP, and takes the following calculation for each DSCP:

$$\frac{\sum_{i=1}^{N}(T6_i - T1_i)}{N} \quad \text{Equation (1)}$$

d) Each measurement is a real number representing the average delay in microseconds.
e) GTP.RttDelayPsaUpfUeMean.DSCP, where DSCP identifies the DSCP.
f) EP_N3 (contained by UPFFunction): EP_N9 (contained by UPFFunction).
g) Valid for packet switched traffic.
h) 5GS.

5.4.6.2 Distribution of Round-Trip Packet Delay Between PSA UPF and UE a) This measurement provides the distribution of round-trip GTP packet delay between the PSA UPF and UE (including the UE processing time). This measurement is split into subcounters per DSCP. This measurement is only applicable to the case the PSA UPF and NG-RAN are not time synchronised.
b) DER (n=1).
c) The measurement is obtained by the following method:
For each DL GTP PDU (packet i) encapsulated with QFI, TEID, sequence number and QMP indicator for QoS monitoring, the PSA UPF records the following time stamps and information (see 3GPP TS 23.501):
T1 that the DL GTP PDU was sent by the PSA UPF;
T6 that the corresponding UL GTP PDU (with QMP indicator and the corresponding sequence number) was received by the PSA UPF.
The DSCP associated to the DL GTP PDU.
The PSA UPF 1) takes the following calculation for each DL GTP PDU (packet i) encapsulated with QFI, TEID, sequence number and QMP indicator for each DSCP, and 2) increments the corresponding bin with the delay range where the result of 1) falls into by 1 for the subcounters per DSCP.

$$T6_i - T1_i \qquad \text{Equation (2)}$$

d) Each measurement is an integer representing the number of DL GTP PDUs measured with the delay within the range of the bin.
e) GTP.RttDelayPsaUpfUeDist.DSCP.Bin, where Bin indicates a delay range which may be vendor specific, and DSCP identifies the DSCP.
f) EP_N3 (contained by UPFFunction): EP_N9 (contained by UPFFunction).
g) Valid for packet switched traffic.
h) 5GS.

5.4.7 One Way Packet Delay Between NG-RAN and PSA UPF 5.4.7.1 UL Packet Delay Between NG-RAN and PSA UPF 5.4.7.1.1 Average UL GTP Packet Delay Between PSA UPF and NG-RAN a) This measurement provides the average UL GTP packet delay between the PSA UPF and NG-RAN. This measurement is split into subcounters per DSCP. This measurement is only applicable to the case the PSA UPF and NG-RAN are time synchronised.
b) DER (n=1).
c) The measurement is obtained by the following method:
The UPF samples the GTP packets for QoS monitoring based on the policy provided by the OAM or SMF. NOTE: The sampling rate may vary for different QoS flows, and the specific the sampling rate may be up to implementation unless given by the QoS monitoring policy.
For each GTP PDU monitoring response packet (packet i) for QoS monitoring, the PSA UPF records the following time stamps and information (see 3GPP TS 23.501 and 38.415):
T3 received in the GTP-U header of the monitoring response packet indicating the local time that the monitoring response packet was sent by the NG-RAN;
T4 that the monitoring response packet was received by the PSA UPF;
The DSCP associated to the GTP PDU.
The PSA UPF counts the number (N) of GTP PDU monitoring response packets for each DSCP, and takes the following calculation for each DSCP:

$$\frac{\sum_{i=1}^{N}(T4_i - T3_i)}{N} \qquad \text{Equation (3)}$$

d) Each measurement is a real number representing the average delay in microseconds.
e) GTP.DelayUlPsaUpfNgranMean.DSCP, where DSCP identifies the DSCP.
f) EP_N3 (contained by UPFFunction): EP_N9 (contained by UPFFunction).
g) Valid for packet switched traffic.
h) 5GS.

5.4.7.1.2 Distribution of UL GTP Packet Delay Between PSA UPF and NG-RAN a) This measurement provides the distribution of UL GTP packet delay between the PSA UPF and NG-RAN. This measurement is split into subcounters per DSCP. This measurement is only applicable to the case the PSA UPF and NG-RAN are time synchronised.
b) DER (n=1).
c) The measurement is obtained by the following method:
The UPF samples the GTP packets for QoS monitoring based on the policy provided by the OAM or SMF. NOTE: The sampling rate may vary for different QoS flows, and the specific the sampling rate may be up to implementation unless given by the QoS monitoring policy.
For each GTP PDU monitoring response packet (packet i) for QoS monitoring, the PSA UPF records the following time stamps and information (see 3GPP TS 23.501 and 38.415):
T3 received in the GTP-U header indicating the local time that the NG-RAN sent out the monitoring response packet to the UPF;
T4 that the monitoring response packet received by the PSA UPF;
The DSCP associated to the DL GTP PDU.
The PSA UPF 1) takes the following calculation for each GTP PDU monitoring response packets for each DSCP, and 2) increments the corresponding bin with the delay range where the result of 1) falls into by 1 for the subcounters per DSCP.

$$T4_i - T3_i \qquad \text{Equation (4)}$$

The DSCP associated to the DL GTP PDU.
d) Each measurement is an integer representing the number of GTP PDUs measured with the delay within the range of the bin.
e) GTP.DelayUlPsaUpfNgranDist.DSCP.Bin, where Bin indicates a delay range which may be vendor specific, and DSCP identifies the DSCP.
f) EP_N3 (contained by UPFFunction); EP_N9 (contained by UPFFunction).
g) Valid for packet switched traffic.
h) 5GS.

5.4.8 Round-Trip Packet Delay Between PSA UPF and NG-RAN

5.4.8.1 Average Round-Trip Packet Delay Between PSA UPF and NG-RAN a) This measurement provides the average round-trip GTP packet delay between the PSA UPF and NG-RAN. This measurement is split into subcounters per DSCP. This measurement is only applicable to the case the PSA UPF and NG-RAN are not time synchronised.
b) DER (n=1).
c) The measurement is obtained by the following method:
The UPF samples the GTP packets for QoS monitoring based on the policy provided by the OAM or SMF. NOTE: The sampling rate may vary for different QoS flows, and the specific the sampling rate may be up to implementation unless given by the QoS monitoring policy.

For each received GTP PDU monitoring response packet (packet i) encapsulated with QFI, TEID, and QMP indicator for QoS monitoring, the PSA UPF records the following time stamps and information (see 3GPP TS 23.501 and 38.415):

T1 received in the GTP-U header of the monitoring response packet indicating the local time that the DL GTP PDU was sent by the PSA UPF;
T2 received in the GTP-U header of the monitoring response packet indicating the local time that the DL GTP PDU was received by the NG-RAN;
T3 received in the GTP-U header of the monitoring response packet indicating the local time that the monitoring response packet was sent by the NG-RAN;
T4 that the monitoring response packet was received by the PSA UPF;
The DSCP associated to the DL GTP PDU.

The PSA UPF counts the number (N) of received GTP PDU monitoring response packets for each DSCP, and takes the following calculation for each DSCP:

$$\frac{\sum_{i=1}^{N}((T4_i - T1)_i - (T3_i - T2_i))}{N} \qquad \text{Equation (5)}$$

d) Each measurement is a real number representing the average delay in microseconds.
e) GTP.RttDelayPsaUpfNgranMean.DSCP, where DSCP identifies the DSCP.
f) EP_N3 (contained by UPFFunction); EP_N9 (contained by UPFFunction).
g) Valid for packet switched traffic.
h) 5GS.

5.4.8.2 Distribution of Round-Trip Packet Delay Between PSA UPF and NG-RAN a) This measurement provides the distribution of round-trip GTP packet delay between the PSA UPF and NG-RAN. This measurement is split into subcounters per DSCP. This measurement is only applicable to the case the PSA UPF and NG-RAN are not time synchronised.
b) DER (n=1).
c) The measurement is obtained by the following method:
The UPF samples the GTP packets for QoS monitoring based on the policy provided by the OAM or SMF. NOTE: The sampling rate may vary for different QoS flows, and the specific the sampling rate may be up to implementation unless given by the QoS monitoring policy.

For each received GTP PDU monitoring response packet (packet i) for QoS monitoring, the PSA UPF records the following time stamps and information (see 3GPP TS 23.501 and 38.415):

T1 received in the GTP-U header of the monitoring response packet indicating the local time that the DL GTP PDU was sent by the PSA UPF;
T2 received in the GTP-U header of the monitoring response packet indicating the local time that the DL GTP PDU was received by the NG-RAN;
T3 received in the GTP-U header of the monitoring response packet indicating the local time that the monitoring response packet was sent by the NG-RAN;
T4 that the monitoring response packet was received by the PSA UPF;
The DSCP associated to the DL GTP PDU.

The PSA UPF 1) takes the following calculation for each received GTP PDU monitoring response packet (packet i) for each DSCP, and 2) increments the corresponding bin with the delay range where the result of 1) falls into by 1 for the subcounters per DSCP.

$$(T4_i - T1_i) - (T3_i - T2_i) \qquad \text{Equation (6)}$$

d) Each measurement is an integer representing the number of DL GTP PDUs measured with the delay within the range of the bin.
e) GTP.RttDelayPsaUpfNgranDist.DSCP.Bin, where Bin indicates a delay range which may be vendor specific, and DSCP identifies the DSCP.
f) EP_N3 (contained by UPFFunction): EP_N9 (contained by UPFFunction).
g) Valid for packet switched traffic.
h) 5GS.

5.4.x One Way Packet Delay Between PSA UPF and UE

5.4.x.1 DL Packet Delay Between PSA UPF and UE

5.4.x.1.1 Average DL Packet Delay Between PSA UPF and UE a) This measurement provides the average DL packet delay between the PSA UPF and UE. This measurement is split into subcounters per DSCP. This measurement is only applicable to the case the PSA UPF and NG-RAN are time synchronised.
b) DER (n=1).
c) The measurement is obtained by the following method:
The UPF samples the GTP packets for QoS monitoring based on the policy provided by the OAM or SMF. NOTE: The sampling rate may vary for QoS flows, and the specific the sampling rate may be up to implementation unless given by the QoS monitoring policy.

For each received GTP PDU monitoring response packet (packet i) for QoS monitoring, the PSA UPF records the following time stamps and information included in the GTP-U header (see 3GPP TS 23.501 and 38.415):

T1 indicating the local time the DL GTP PDU monitoring packet was sent by the PSA UPF;
T2 indicating the local time that the DL GTP PDU monitoring packet was received by the NG-RAN;
The DL Delay Result from the NG-RAN to UE indicating the downlink delay measurement result, which is the sum of the delay incurred in the NG-RAN (including the delay at the gNB-CU-UP, on the F1-U interface and on the gNB-DU) and the delay over the Uu interface (see 3GPP TS 38.415, and the DL Delay Result is denoted by DRdl);
The DSCP associated to the DL GTP PDU monitoring response packet.

The PSA UPF counts the number (N) of GTP PDU monitoring response packets for each DSCP, and takes the following calculation for DSCP:

$$\frac{\sum_{i=1}^{N}(T2_i - T1_i + DRdl_i)}{N} \quad \text{Equation (7)}$$

d) Each measurement is a real number representing the average delay in microseconds.
e) GTP.DelayDiPsaUpfUeMean.DSCP, where DSCP identifies the DSCP.
f) EP_N3 (contained by UPFFunction); EP_N9 (contained by UPFFunction).
g) Valid for packet switched traffic.
h) 5GS.

5.4.x.1.2 Distribution of DL Packet Delay Between PSA UPF and UE a) This measurement provides the distribution of DL packet delay between the PSA UPF and UE. This measurement is split into subcounters per DSCP. This measurement is only applicable to the case the PSA UPF and NG-RAN are time synchronised.
b) DER (n=1).
c) The measurement is obtained by the following method:
NOTE: The sampling rate may vary for QoS flows, and the specific the sampling rate may be up to implementation unless given by the QoS monitoring policy.

For each received DL GTP PDU monitoring response packet (packet i) for QoS monitoring, the PSA UPF records the following time stamps and information included in the GTP-U header (see 3GPP TS 23.501 and 38.415):

T1 indicating the local time the DL GTP PDU monitoring packet was sent by the PSA UPF;
T2 indicating the local time that the DL GTP PDU monitoring packet was received by the NG-RAN;
The DL Delay Result from the NG-RAN to UE indicating the downlink delay measurement result which is the sum of the delay incurred in the NG-RAN (including the delay at the gNB-CU-UP, on the F1-U interface and on the gNB-DU) and the delay over the Uu interface (see 3GPP TS 38.415,and the DL Delay Result is denoted by DRdl);
The 5G QoS Identifier (5QI) and Single Network Slice Selection Assistance Information (S-NSSAI) associated to the DL GTP PDU monitoring response packet.

The PSA UPF 1) takes the following calculation for each GTP PDU monitoring response packet for each DSCP, and 2) increments the corresponding bin with the delay range where the result of 1) falls into by 1 for the subcounter per DSCP.

$$T2_i - T1_i + DRdl_i \quad \text{Equation (8)}$$

d) Each measurement is an integer representing the number of GTP PDUs measured with the delay within the range of the bin.
e) GTP.DelayDlPsaUpfUeDist.DSCP.bin, where Bin indicates a delay range which may be vendor specific, and DSCP identifies the DSCP.
) EP_N3 (contained by UPFFunction); EP_N9 (contained by UPFFunction).
g) Valid for packet switched traffic.
h) 5GS.

5.4.x.y UL Packet Delay Between PSA UPF and UE
5.4.x.y.1 Average UL Packet Delay Between PSA UPF and UE a) This measurement provides the average UL packet delay between PSA UPF and UE. This measurement is split into subcounters per DSCP. This measurement is only applicable to the case the PSA UPF and NG-RAN are time synchronised.
b) DER (n=1).
c) The measurement is obtained by the following method:
The UPF samples the GTP packets for QoS monitoring based on the policy provided by OAM or SMF. NOTE: The sampling rate may vary for QoS flows, and the specific the sampling rate may be up to implementation unless given by the QoS monitoring policy.

For each received GTP PDU monitoring response packet (packet i) for QoS monitoring, the PSA UPF records the following time stamps and information (see 3GPP TS 23.501 and 38.415):

T3 received in the GTP-U header of the monitoring response packet indicating the local time that the monitoring response packet was sent by the NG-RAN;
T4 that the monitoring response packet was received by the PSA UPF;
The UL Delay Result from the UE to NG-RAN indicating the uplink delay measurement result which is the sum of the delay incurred in the NG-RAN (including the delay at the gNB-CU-UP, on the F1-U interface and on the gNB-DU) and the delay over the Uu interface (see 3GPP TS 38.415, and the UL Delay Result is denoted by DRul);
The 5QI and S-NSSAI associated to the GTP PDU monitoring response packet.

The PSA UPF counts the number (N) of GTP PDU monitoring response packets for each DSCP, and takes the following calculation for each DSCP:

$$\frac{\sum_{i=1}^{N}(T4_i - T3_i + DRul_i)}{N} \quad \text{Equation (9)}$$

d) Each measurement is a real number representing the average delay in microseconds.
e) GTP.DelayUIPsaUpfUeMean.DSCP, where DSCP identifies the DSCP:
f) EP_N3 (contained by UPFFunction); EP_N9 (contained by UPFFunction).
g) Valid for packet switched traffic.
h) 5GS.

5.4.x.y.2 Distribution of UL Packet Delay Between PSA UPF and UE a) This measurement provides the distribution of UL packet delay between PSA UPF and UE. This measurement is split into subcounters per DSCP. This measurement is only applicable to the case the PSA UPF and NG-RAN are time synchronised.
b) DER (n=1).
c) The measurement is obtained by the following method:
The UPF samples the GTP packets for QoS monitoring based on the policy provided by the OAM or SMF. NOTE: The sampling rate may vary for QoS flows, and the specific the sampling rate may be up to implementation unless given by the QoS monitoring policy.

For each received GTP PDU monitoring response packet (packet i) for QoS monitoring, the PSA UPF records the following time stamps and information (see 3GPP TS 23.501 and 38.415):

T3 received in the GTP-U header of the monitoring response packet indicating the local time that the monitoring response packet was sent by the NG-RAN.

T4 that the monitoring response packet was received by the PSA UPF;

The UL Delay Result from UE to NG-RAN indicating the uplink delay measurement result which is the sum of the delay incurred in the NG-RAN (including the delay at the gNB-CU-UP, on the F1-U interface and on the gNB-DU) and the delay over the Uu interface (see 3GPP TS 38.415, and the UL Delay Result is denoted by DRul);

The 5QI and S-NSSAI associated to the GTP PDU monitoring response packet.

The PSA UPF 1) takes the following calculation for each GTP PDU monitoring response packet (packet i) for each DSCP, and 2) increments the corresponding bin with the delay range where the result of 1) falls into by 1 for the subcounter per DSCP.

$$T4_i - T3_i + DRul_i \quad \text{Equation (10)}$$

d) Each measurement is an integer representing the number of GTP PDUs measured with the delay within the range of the bin.

e) GTP.DelayUlPsaUpfUeDist.DSCP.bin, where Bin indicates a delay range which may be vendor specific, and DSCP identifies the DSCP.

f) EP_N3 (contained by UPFFunction); EP_N9 (contained by UPFFunction).

g) Valid for packet switched traffic.

h) 5GS.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The subject matter may be referred to herein, individually and/or collectively, by the term "embodiment" merely for convenience and without intending to voluntarily limit the scope of this application to any single inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus for a session management function (SMF) in a 5$^{th}$ generation (5G) system, the apparatus comprising:

processing circuitry configured to:

determine whether quality of service (QoS) monitoring per QoS flow per user equipment (UE) for ultra-reliable low-latency communication (URLLC) service is enabled;

determine whether General Packet Radio Service (GPRS) Tunneling Protocol (GTP) user plane (GTP-U) path QoS monitoring is enabled;

when the QoS monitoring per QoS flow per UE for URLLC service is enabled:

send, to a packet data unit (PDU) session anchor (PSA) user plane function (UPF) and a next generation radio access network (NG-RAN), a request for the QoS monitoring per QoS flow per UE, the request for the QoS monitoring per QoS flow per UE comprising an indication that event-triggered QoS flow QoS monitoring is supported and at least one delay threshold to report packet delay for the QoS monitoring per QoS flow per UE; and in response to the at least one delay threshold to report packet delay for the QoS monitoring per QoS flow per UE being reached, receive, from the PSA UPF, a report containing results from the QoS monitoring per QoS flow per UE; and when the GTP-U path QoS monitoring is enabled:

send, to the PSA UPF and the NG-RAN, a request for the GTP-U path QoS monitoring, the request for the GTP-U path QoS monitoring comprising an indication that event-triggered GTP-U path QoS monitoring is supported and at least one delay threshold to report packet delay for the GTP-U path QoS monitoring;

in response to the at least one delay threshold to report packet delay for the GTP-U path QoS monitoring being reached, receive, from the PSA UPF, a report containing results from the GTP-U path QoS monitoring; and
determine, based on the report containing results from the GTP-U path QoS monitoring, QoS flow mapping to a network instance; and
a memory configured to store the report containing results from the GTP-U path QoS monitoring.

2. The apparatus of claim 1, wherein the processing circuitry is to further encode the request for the QoS monitoring per QoS flow (QF) per UE to include a QFQoSMonitoringControl information object class (IOC) that provides capabilities and properties for the QoS monitoring per QoS flow per UE.

3. The apparatus of claim 2, wherein the processing circuitry is to further encode the QFQoSMonitoringControl IOC to include thresholds for reporting timing to report packet delay for the QoS monitoring, the timing related to the packet delay for QoS monitoring per QoS flow per UE comprising uplink (UL) and downlink (DL) packet delay and round trip time packet delay between the UE and the PSA UPF.

4. The apparatus of claim 2, wherein the processing circuitry is to further encode the QFQoSMonitoringControl IOC to include a state of QoS monitoring per QoS flow per UE for URLLC service, a Single Network Slice Selection Assistance Information (S-NSSAI) for which the QoS monitoring per QoS flow per UE is to be performed, a 5G QoS Identifier (5QI) for which the QoS monitoring per QoS flow per UE is to be performed, an indication of whether event based QoS monitoring reporting per QoS flow per UE is supported, an indication of whether periodic QoS monitoring reporting per QoS flow per UE is supported, an indication of whether session release-based QoS monitoring reporting per QoS flow per UE is supported, thresholds for reporting the packet delay between the PSA UPF and UE for QoS monitoring per QoS flow per UE, a minimum waiting time between consecutive reports for event-triggered QoS monitoring reporting per QoS flow per UE, and a period to report measured packet delay for QoS monitoring per QoS flow per UE.

5. The apparatus of claim 1, wherein the processing circuitry is to determine that the packet delay for the GTP-U path QoS monitoring comprises an average of at least one of uplink (UL) or downlink (DL) packet delay between the PSA UPF and the NG-RAN.

6. The apparatus of claim 5, wherein the processing circuitry is to further encode the request for the GTP-U path QoS monitoring to include a GtpUPathQoSMonitoringControl information object class (IOC) that provides capabilities and properties for the GTP-U path QoS monitoring.

7. The apparatus of claim 6, wherein the processing circuitry is to further encode the GtpUPathQoSMonitoringControl IOC to include thresholds for reporting, for at least one of an N3 or N9 interface: average packet delay, minimum packet delay and maximum packet delay.

8. The apparatus of claim 6, wherein the processing circuitry is to further encode the GtpUPathQoSMonitoringControl IOC to include a state of QoS monitoring, a Differentiated Services Code Point (DSCP) for which the GTP-U path QoS monitoring is to be performed, an indication of whether event triggered GTP-U path QoS monitoring reporting based on thresholds is supported, an indication of whether periodic GTP-U path QoS monitoring reporting is supported, an indication of whether immediate GTP-U path QoS monitoring reporting is supported, thresholds for reporting the packet delay for GTP-U path QoS monitoring, a minimum waiting time between consecutive reports for event triggered GTP-U path QoS monitoring reporting, and a period for reporting the packet delay for GTP-U path QoS monitoring.

9. An apparatus configured to operate as packet data unit (PDU) session anchor (PSA) user plane function (UPF) in a $5^{th}$ generation (5G) system, the apparatus comprising:
processing circuitry configured to:
receive, from a session management function (SMF), a request to perform quality of service (QoS) monitoring, the request comprising an indication that event-triggered QoS monitoring is supported and thresholds to trigger reporting of the QoS monitoring if the event-triggered QoS monitoring is supported, the QoS monitoring comprising at least one of:
QoS monitoring per QoS flow per user equipment (UE) for ultra-reliable low-latency communication (URLLC) service between the PSA UPF and a next generation radio access network (NG-RAN), or
General Packet Radio Service (GPRS) Tunneling Protocol (GTP) user plane (GTP-U) path QoS monitoring;
in response to reception of the request, perform the QoS monitoring, the QoS monitoring including:
uplink (UL) or downlink (DL) packet delay and round trip time (RTT) between the PSA UPF and UE for QoS monitoring per QoS flow per UE, and
packet delays between the PSA UPF and NG-RAN for GTP-U path QoS monitoring;
send, to the SMF in response to at least one of the thresholds having been met, a report containing measurements of the QoS monitoring associated with the at least one of the thresholds; and
determine, based on the report for GTP-U path QoS monitoring, QoS flow mapping to a network instance; and
a memory configured to store the measurements.

10. The apparatus of claim 9, wherein the request comprises an information object class (IOC) that provides capabilities and properties for the QoS monitoring, the capabilities and properties for the QoS monitoring comprising the thresholds to trigger reporting of the QoS monitoring.

11. The apparatus of claim 9, wherein:
for QoS monitoring per QoS flow per UE, the measurements comprise an average of at least one of UL, DL packet delay or RTT between the PSA UPF and the UE, and
for GTP-U path QoS monitoring, the measurements comprise packet delay for at least one of an N3 or N9 interface.

12. The apparatus of claim 11, wherein the measurements comprise, for at least one of the N3 or N9 interface: at least one of average packet delay, minimum packet delay or maximum packet delay.

13. The apparatus of claim 9, wherein for QoS monitoring per QoS flow per UE, the request comprises a state of QoS monitoring per QoS flow per UE for URLLC service, a Single Network Slice Selection Assistance Information (S-NSSAI) for which the QoS monitoring per QoS flow per UE is to be performed, a 5G QoS Identifier (5QI) for which the QoS monitoring per QoS flow per UE is to be performed, an indication of whether event based QoS monitoring reporting per QoS flow per UE is supported, an indication of whether periodic QoS monitoring reporting per QoS flow per UE is supported, an indication of whether session release-based QoS monitoring reporting per QoS flow per UE is supported, thresholds for reporting the packet delay between the PSA UPF and UE for QoS monitoring per QoS flow per UE, a minimum waiting time between consecutive reports for event-triggered QoS monitoring reporting per QoS flow per UE, and a period to report measured packet delay for QoS monitoring per QoS flow per UE.

14. The apparatus of claim 9, wherein the request comprises a state of QoS monitoring, a Differentiated Services Code Point (DSCP) for which the GTP-U path QoS monitoring is to be performed, an indication of whether event triggered GTP-U path QoS monitoring reporting based on thresholds is supported, an indication of whether periodic GTP-U path QoS monitoring reporting is supported, an indication of whether immediate GTP-U path QoS monitoring reporting is supported, thresholds for reporting the packet delay for GTP-U path QoS monitoring, a minimum waiting time between consecutive reports for event triggered GTP-U path QoS monitoring reporting, and a period for reporting the packet delay for GTP-U path QoS monitoring.

15. The apparatus of claim 9, wherein the measurements are provided per Differentiated Services Code Point (DSCP).

16. A non-transitory computer-readable storage medium that stores instructions for execution by one or more processors of a session management function (SMF) in a new radio (NR) network, the one or more processors to configure the SMF to, when the instructions are executed:
send, to a packet data unit (PDU) session anchor (PSA) user plane function (UPF) and a next generation radio access network (NG-RAN), a request to perform quality of service (QoS) monitoring per QoS flow per user equipment (UE) for ultra-reliable low-latency communication (URLLC) service between the PSA UPF and a next generation radio access network (NG-RAN) or General Packet Radio Service (GPRS) Tunneling Protocol (GTP) user plane (GTP-U) path, the request comprising an indication that event-triggered QoS monitoring is supported and thresholds for reporting packet delay measurements dependent on which of QoS monitoring per QoS flow per UE and GTP-U path QoS monitoring is indicated in the request if the event-triggered QoS monitoring is supported; and
receive, from at least one of the PSA UPF or the NG-RAN, a report containing the packet delay measurements in response to a threshold for reporting the packet delay measurements to the SMF being reached.

17. The medium of claim 16, wherein:
for QoS monitoring per QoS flow per UE, the packet delay measurements comprise average UL, DL packet delay and RTT between the PSA UPF and the UE, and
for GTP-U path QoS monitoring, the packet delay measurements comprise packet delay associated with at least one of an N3 or N9 interface.

18. The medium of claim 17, wherein the packet delay measurements comprise, for at least one of the N3 or N9 interface: average packet delay, minimum packet delay and maximum packet delay.

19. The medium of claim 17, wherein for QoS monitoring per QoS flow per UE, the request comprises a state of QoS monitoring per QoS flow per UE for URLLC service, a Single Network Slice Selection Assistance Information (S-NSSAI) for which the QoS monitoring per QoS flow per UE is to be performed, a 5G QoS Identifier (5QI) for which the QoS monitoring per QoS flow per UE is to be performed, an indication of whether event based QoS monitoring reporting per QoS flow per UE is supported, an indication of whether periodic QoS monitoring reporting per QoS flow per UE is supported, an indication of whether session release-based QoS monitoring reporting per QoS flow per UE is supported, thresholds for reporting the packet delay between the PSA UPF and UE for QoS monitoring per QoS flow per UE, a minimum waiting time between consecutive reports for event-triggered QoS monitoring reporting per QoS flow per UE, and a period to report measured packet delay for QoS monitoring per QoS flow per UE.

20. The medium of claim 17, wherein the request comprises a state of QoS monitoring, a Differentiated Services Code Point (DSCP) for which the GTP-U path QoS monitoring is to be performed, an indication of whether event triggered GTP-U path QoS monitoring reporting based on thresholds is supported, an indication of whether periodic GTP-U path QoS monitoring reporting is supported, an indication of whether immediate GTP-U path QoS monitoring reporting is supported, thresholds for reporting the packet delay for GTP-U path QoS monitoring, a minimum waiting time between consecutive reports for event triggered GTP-U path QoS monitoring reporting, and a period for reporting the packet delay for GTP-U path QoS monitoring.

* * * * *